US011455351B2

(12) United States Patent
Fan et al.

(10) Patent No.: US 11,455,351 B2
(45) Date of Patent: Sep. 27, 2022

(54) METHOD AND SYSTEM FOR ONLINE USER PROFILING

(71) Applicant: YAHOO ASSETS LLC, Dulles, VA (US)

(72) Inventors: Xin Fan, Beijing (CN); Liang Wang, Beijing (CN); Hao Zheng, Saratoga, CA (US)

(73) Assignee: YAHOO ASSETS LLC, Dulles, VA (US)

(*) Notice: Subject to any disclaimer, the term of this patent is extended or adjusted under 35 U.S.C. 154(b) by 449 days.

(21) Appl. No.: 14/436,640

(22) PCT Filed: Feb. 11, 2015

(86) PCT No.: PCT/CN2015/072768
§ 371 (c)(1),
(2) Date: Apr. 17, 2015

(87) PCT Pub. No.: WO2016/127338
PCT Pub. Date: Aug. 18, 2016

(65) Prior Publication Data
US 2016/0371378 A1 Dec. 22, 2016

(51) Int. Cl.
G06F 16/9535 (2019.01)
G06F 16/901 (2019.01)
G06F 16/2457 (2019.01)
H04L 67/10 (2022.01)
H04L 67/306 (2022.01)

(52) U.S. Cl.
CPC .... *G06F 16/9535* (2019.01); *G06F 16/24578* (2019.01); *G06F 16/9024* (2019.01); *H04L 67/10* (2013.01); *H04L 67/306* (2013.01)

(58) Field of Classification Search
None
See application file for complete search history.

(56) References Cited

U.S. PATENT DOCUMENTS 5,933,822 A * 8/1999 Braden-Harder ... G06F 16/3344
8,135,800 B1 * 3/2012 Walsh ............... G06F 17/30702
707/723
9,165,305 B1 * 10/2015 Chandra ................. G06F 12/06
(Continued)

OTHER PUBLICATIONS

International Search Report and Written Opinion dated Nov. 16, 2015 in International Application PCT/CN2015/072768.
(Continued)

*Primary Examiner* — Tony Mahmoudi
*Assistant Examiner* — Umar Mian
(74) *Attorney, Agent, or Firm* — Venable LLP

(57) ABSTRACT

The present teaching relates to online user profiling. In one example, content associated with a first user of a social media network is obtained. From the content associated with the first user, a first link to a first piece of content is identified. A second user of the social media network associated with the first user is determined in the context of the social media network. From content associated with the second user of the social media network, a second link to a second piece of content is identified. The first and second pieces of content are retrieved based on the first and second links, respectively. User profile of the first user is generated based, at least in part, on the first and second pieces of content.

18 Claims, 14 Drawing Sheets

(56) References Cited

U.S. PATENT DOCUMENTS

| | | | |
|---|---|---|---|
| 2009/0198662 A1* | 8/2009 | Prabhakar | G06F 16/951 |
| 2010/0023506 A1* | 1/2010 | Sahni | G06F 16/955 |
| | | | 707/E17.014 |
| 2010/0250341 A1* | 9/2010 | Hauser | G06Q 30/0282 |
| | | | 707/E17.042 |
| 2010/0281041 A1 | 11/2010 | Almeida | |
| 2012/0095978 A1* | 4/2012 | Levin | G06Q 30/02 |
| | | | 707/706 |
| 2012/0324004 A1* | 12/2012 | Le | G06Q 10/00 |
| | | | 709/204 |
| 2013/0018968 A1* | 1/2013 | Pennacchiotti | G06Q 30/0201 |
| | | | 709/206 |
| 2013/0073536 A1* | 3/2013 | Fedorynski | G06F 16/951 |
| | | | 707/709 |
| 2013/0218865 A1* | 8/2013 | Angulo | G06F 17/30864 |
| | | | 707/709 |
| 2013/0297619 A1* | 11/2013 | Chandrasekaran | G06Q 10/10 |
| | | | 707/748 |
| 2013/0304731 A1* | 11/2013 | Zheng | G06Q 30/0201 |
| | | | 707/728 |
| 2014/0089327 A1* | 3/2014 | Pavlidis | G06F 17/30017 |
| | | | 707/749 |
| 2015/0370798 A1* | 12/2015 | Ju | G06F 16/9535 |
| | | | 707/748 |

OTHER PUBLICATIONS

International Preliminary Report on Patentability dated Aug. 4, 2017 in International Application PCT/CN2015/072768.

* cited by examiner

METHOD AND SYSTEM FOR ONLINE USER PROFILING

CROSS REFERENCE TO RELATED APPLICATION

This application is a national stage application, filed under 35 U.S.C. § 371, of International Application No. PCT/CN2015/072768, filed on Feb. 11, 2015, entitled "METHOD AND SYSTEM FOR ONLINE USER PROFILING", which is hereby incorporated by reference in its entirety.

BACKGROUND

1. Technical Field

The present teaching relates to methods, systems, and programming for online user profiling. More specifically, the present teaching is directed to methods, systems, and programming for social media network user profiling.

2. Discussion of Technical Background

Personalized content has been increasingly served by online content providers as delivering personalized content is critical to make people's daily lives inspiring and entertaining. To extend the user scope and make users more engaged, a good understanding of what users like is needed.

In the known personalization systems, the user interest profiles are built mainly based on the user declaration and user historic behaviors on the content served by the content providers. Information from other sources, e.g., users' online behaviors in the third party networks, however, is rarely considered by the known personalization systems for inferring user interests. Therefore, there is a need to provide an improved solution for online user profiling to solve the above-mentioned problems.

SUMMARY

The present teaching relates to methods, systems, and programming for online user profiling. More specifically, the present teaching is directed to methods, systems, and programming for social media network user profiling.

In one example, a method, implemented on at least one computing device each having at least one processor, storage, and a communication platform connected to a network for online user profiling is disclosed. Content associated with a first user of a social media network is obtained. From the content associated with the first user, a first link to a first piece of content is identified. A second user of the social media network associated with the first user is determined in the context of the social media network. From content associated with the second user of the social media network, a second link to a second piece of content is identified. The first and second pieces of content are retrieved based on the first and second links, respectively. User profile of the first user is generated based, at least in part, on the first and second pieces of content.

In a different example, a system for online user profiling is disclosed. The system includes a first content retrieving unit, a social graph analyzing module, a link extraction unit, a second content retrieving unit, and a user interest scoring unit. The first content retrieving unit is configured to obtain content associated with a first user of a social media network. The social graph analyzing module is configured to determine a second user of the social media network associated with the first user in the context of the social media network. The link extraction unit is configured to identify, from the content associated with the first user, a first link to a first piece of content, and identify, from content associated with the second user of the social media network, a second link to a second piece of content. The second content retrieving unit is configured to retrieve the first and second pieces of content based on the first and second links, respectively. The user interest scoring unit is configured to generate user profile of the first user based, at least in part, on the first and second pieces of content.

Other concepts relate to software for implementing the present teaching on online user profiling. A software product, in accord with this concept, includes at least one non-transitory machine-readable medium and information carried by the medium. The information carried by the medium may be executable program code data, parameters in association with the executable program code, and/or information related to a user, a request, content, or information related to a social group, etc.

In one example, a non-transitory machine readable medium having information recorded thereon for online user profiling is disclosed. The recorded information, when read by the machine, causes the machine to perform a series of processes. Content associated with a first user of a social media network is obtained. From the content associated with the first user, a first link to a first piece of content is identified. A second user of the social media network associated with the first user is determined in the context of the social media network. From content associated with the second user of the social media network, a second link to a second piece of content is identified. The first and second pieces of content are retrieved based on the first and second links, respectively. User profile of the first user is generated based, at least in part, on the first and second pieces of content.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
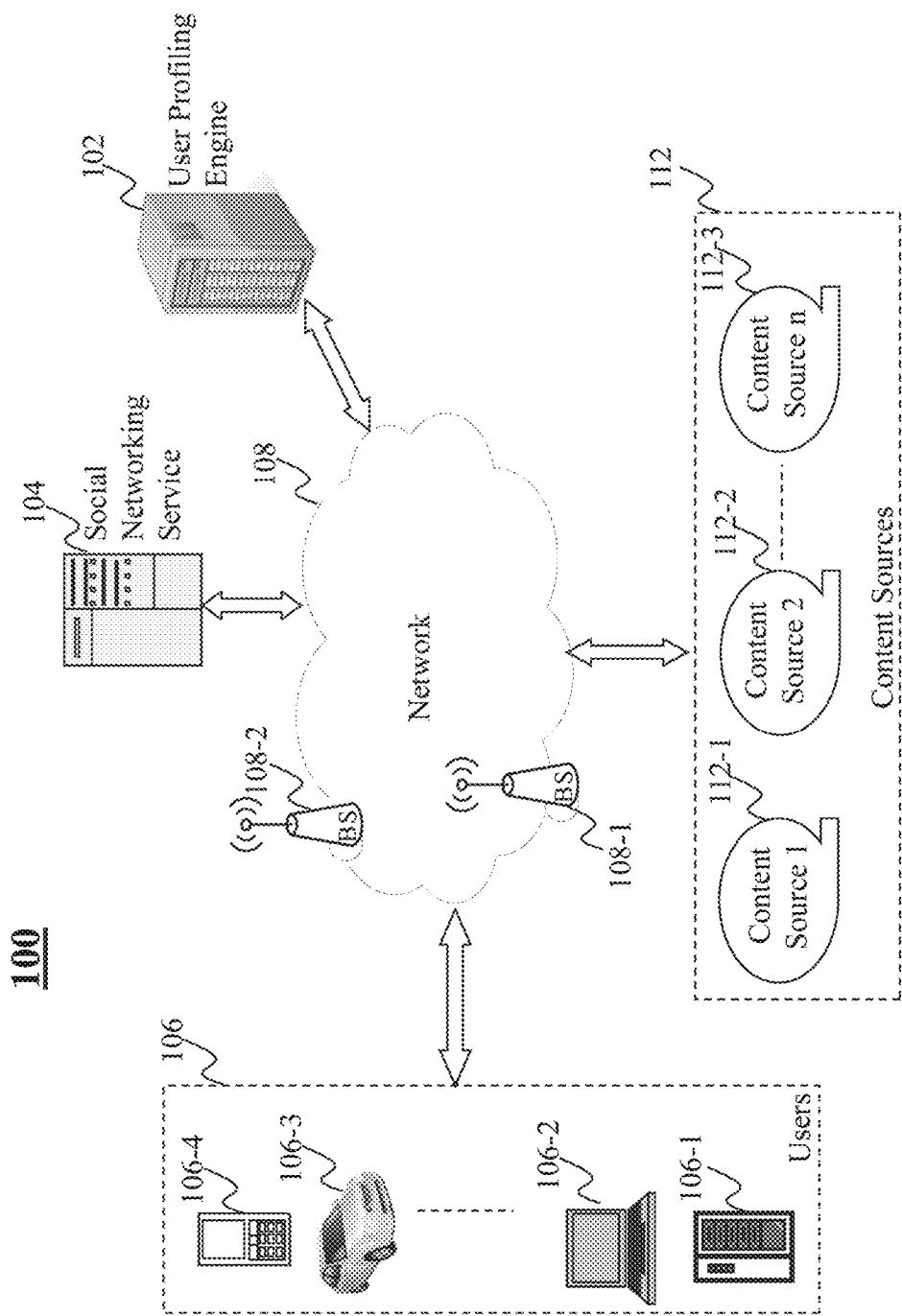
FIGS. 1-4 illustrate exemplary system configurations in which a user profiling engine can be deployed, according to various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching describes method, system, and programming aspects of online user profiling based on users' content and signals on social media networks. The method and system in the present teaching can generate a profile of a social media network user, which contains various features such as entities, categories, content sources (e.g., publisher), phrases, etc. derived from the content associated with the user of interest and/or other related users in the context of the social media network.

In some embodiments of the present teaching, not only the content itself produced or consumed by a social media network user, but also links identified in the content, are analyzed and used as content sources for user profiling. In some embodiments of the present teaching, social graph of the user in the context of the social media network is used for identifying other social media network users, whose content and/or links in the content may be analyzed and used as additional content sources for user profiling. Content items from various sources, as mentioned above, including the user's content and linked content and other associated users' content and linked content, may be aggregated in creating the user profile.

Moreover, in some embodiments of the present teaching, a baseline user profile, which reflects the general popular interests among all users of the social media network or among a set of users, is introduced and used for adjusting a user's own profile, for example, by penalizing the general popular interests and promoting the user's unique interests.

FIGS. 1-4 illustrate exemplary system configurations in which a user profiling engine can be deployed, according to various embodiments of the present teaching. In FIGS. 1-4, the exemplary system includes a user profiling engine 102, a social networking service (SNS, a.k.a. social media network) 104, users 106, a network 108, one or more publisher portals or content providers 110, and content sources 112 including content source 1 112-1, content source 2 112-2, . . . , content source n 112-3.

The network 108 may be a single network or a combination of different networks. For example, a network may be a local area network (LAN), a wide area network (WAN), a public network, a private network, a proprietary network, a Public Switched Telephone Network (PSTN), the Internet, a wireless network, a cellular network, a virtual network, or any combination thereof. A network may also include various network access points, e.g., wired or wireless access points such as base stations or Internet exchange points 108-1, . . . , 108-2, through which a data source may connect to the network 108 in order to transmit information via the network 108, and a network node may connect to the network 108 in order to receive information.

The social networking service 104 may be any digital platform for building social networks or social relations among people who share interests, activities, backgrounds, and/or real-life connections. The social networking service 104 may include representations for each user, social links/graph of each user, and any additional services, e.g., communication, information sharing (e.g., sharing photos, videos, posts, events, and ideas), blogging, micro-blogging, etc. The social networking service 104 may be provided as a web-based service, including means for users to interact over the Internet, or as a mobile-based service with instant messaging clients installed on the users' mobile devices, e.g., smart phones and tablets. The social networking service 104 includes, for example, Twitter, Facebook, Google+, LinkedIn, Instagram, Pinterest, MySpace, Vine, Tumblr, Snapchat, WhatsApp, WeChat, Weibo, Renren, Line, to name a few.

The users 106 may be of different types such as users connected to the network 108 via desktop connections (106-1), users connecting to the network 108 via wireless connections such as through a laptop (106-2), a handheld device (106-4), or a built-in device in a mobile vehicle such as a motor vehicle (106-3). The users 106 may be connected to the network 108 and able to log into the social networking service 104. The users 106 may be users of the social networking service 104, who are connected with each other in the context of the social networking service 104. The users 106 of the social networking service 104 may be associated in various manners: for example, one user follows one or more other users; multiple users belong to the same group of the social networking service 104.

In some embodiments, as will be described in further detail below, the user profiling engine 102 may analyze the content associated with a user 106 of the social networking service 104, either content produced by the user 106 (e.g., posts, tweets, etc.) or content consumed by the user 106 (e.g., liked posts, re-tweets, etc.) and extract features from the content based on any suitable content analysis models. The user profiling engine 102 may also extract links, e.g., uniform resource locator (URL), from the content and further retrieve and analyze the linked content (additional content directed by the links) to obtain additional features. The features relate to the interests of the user 106, including, for example, entities, categories, content sources (publishers), and phrases. Based on the features extracted from both the user's own content and the linked content, the user profiling engine 102 may generate a user profile vector representing the user's profile.

In some embodiments, as will be described in further detail below, to better infer the user's interests in the context of the social networking service 104, the user profiling engine 102 may identify additional users of the social networking service 104 whom are associated with the user 106 of interest based on the user's social graph, e.g., other users followed by the user 106. The user profiling engine 102 then may similarly extract features from both the additional users' own content and linked content and aggregate them with features extract from the user's own content and linked content to generate the user profile vector for the user 106 of interest.

In some embodiments, as will be described in further detail below, to penalize the general popular interests and promote a user's unique interests, the user profiling engine 102 may further generate a baseline user profile based on user profiles of a plurality of users of the social networking service 104 and adjust each user's profile based on the baseline user profile.

The content sources 112 include multiple content sources 112-1, 112-2, . . . , 112-3, such as vertical content sources (domains). A content source 112 may correspond to a website hosted by an entity, whether an individual, a business, or an organization such as USPTO.gov, a content provider such as cnn.com and Yahoo.com, or a content feed source. In this embodiment, linked content may be retrieved by the user profiling engine 102 from the content sources 112. For example, URLs identified in content associated with a user 106 of the social networking service 104 may direct to linked content stored in the content sources 112. The user profiling engine 102 and social networking service 104 may access information from any of the content sources 112-1, 112-2, . . . , 112-3.

Figure 2:
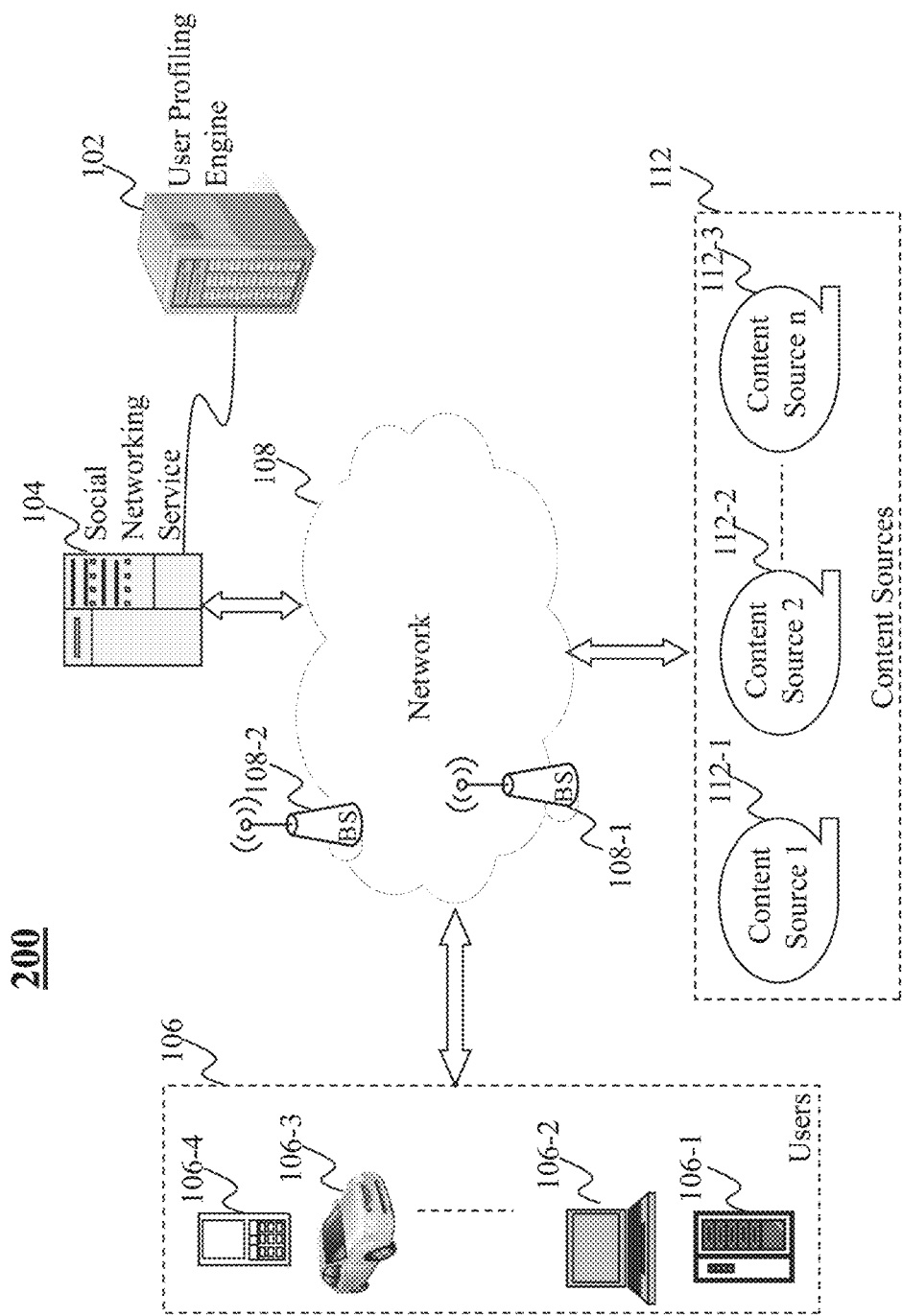

FIG. 1 shows a system configuration 100 in which the user profiling engine 102 serves as an independent service provider in relation to the social networking service 104. In this configuration, the user profiling engine 102 can be connected to a plurality of social networking services and facilitate online user profiling as a service to any social networking service. FIG. 2 presents a slightly different system configuration 200 in which the user profiling engine 102 is coupled to the social networking service 104 as a backend sub-system. In this configuration, the user profiling engine 102 as shown is used only by the social networking service 104 in operation.

Figure 3:
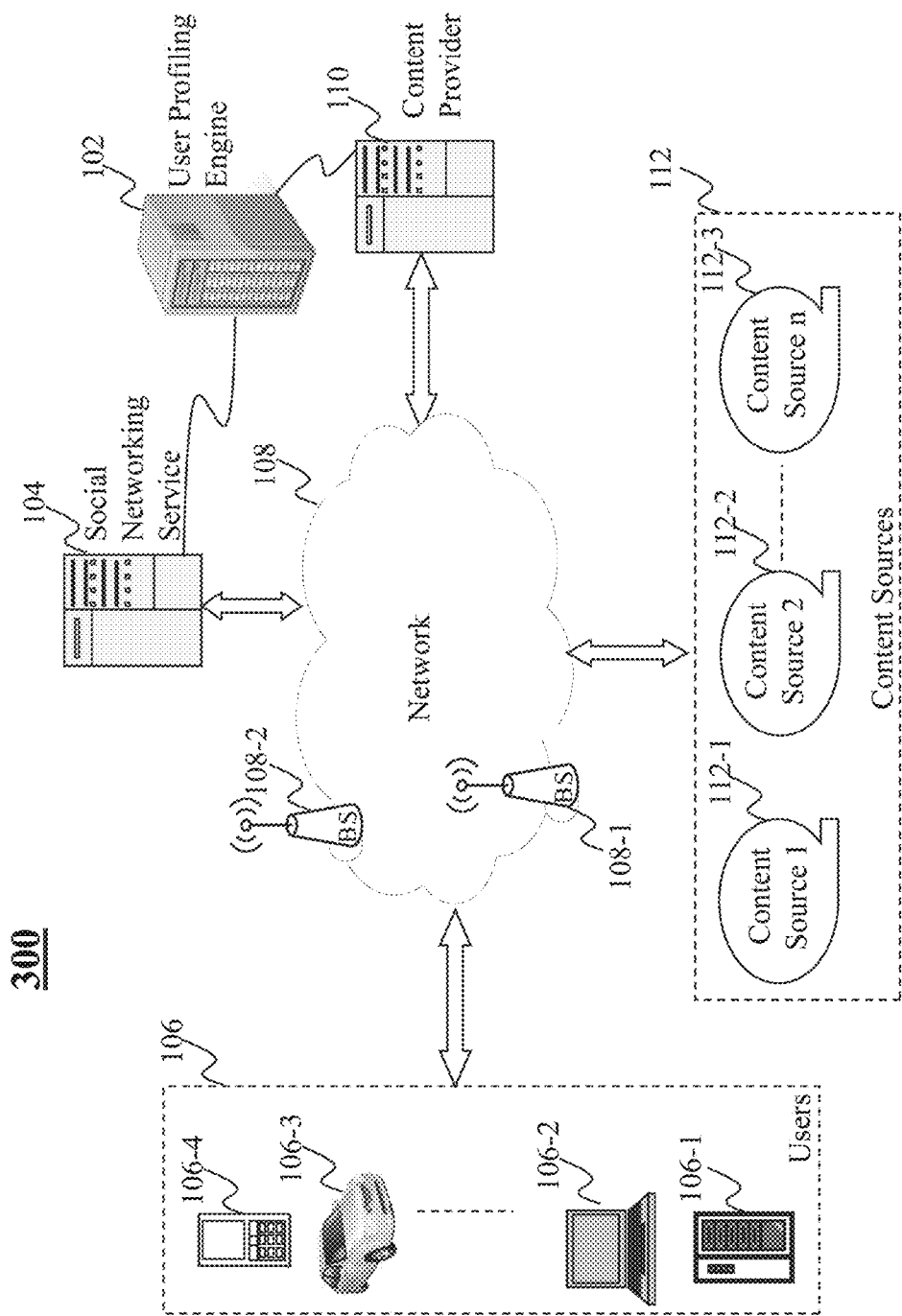

FIG. 3 presents a slightly different system configuration 300 in which the one or more publisher portals or content providers 110 are also included. The content provider 110 may be a publisher, a search engine, a content portal, or any other sources from which content can be obtained. The content provider 110 may correspond to an entity, whether an individual, a firm, or an organization, publishing or supplying content, including a blogger, television station, a newspaper issuer, a web page host, a content portal, an online service provider, or a game server. The content provider 110 may receive information related to user profiles, including declared and inferred user interests, from various sources for applications such as personalized content recommendation or individualized search.

In this example, the users 106 may be users of both the social networking service 104 and the content provider 110. The user profiling engine 102 may map users between the social networking service 104 and the content provider 110 by similarity-based matching of the user registration information (e.g., the name, birthday, email, geo-location, etc.) from the social networking service 104 and the content provider 110 or by data mining of notification information (e.g., notification emails sent by the social networking service 104 using the email service of the content provider 110). Based on the user mapping between the social networking service 104 and the content provider 110, the user profiling engine 102 may aggregate the same user's separate profiles generated from the social networking service 104 and from the content provider 110 to create a more comprehensive profile for the user.

Figure 4:
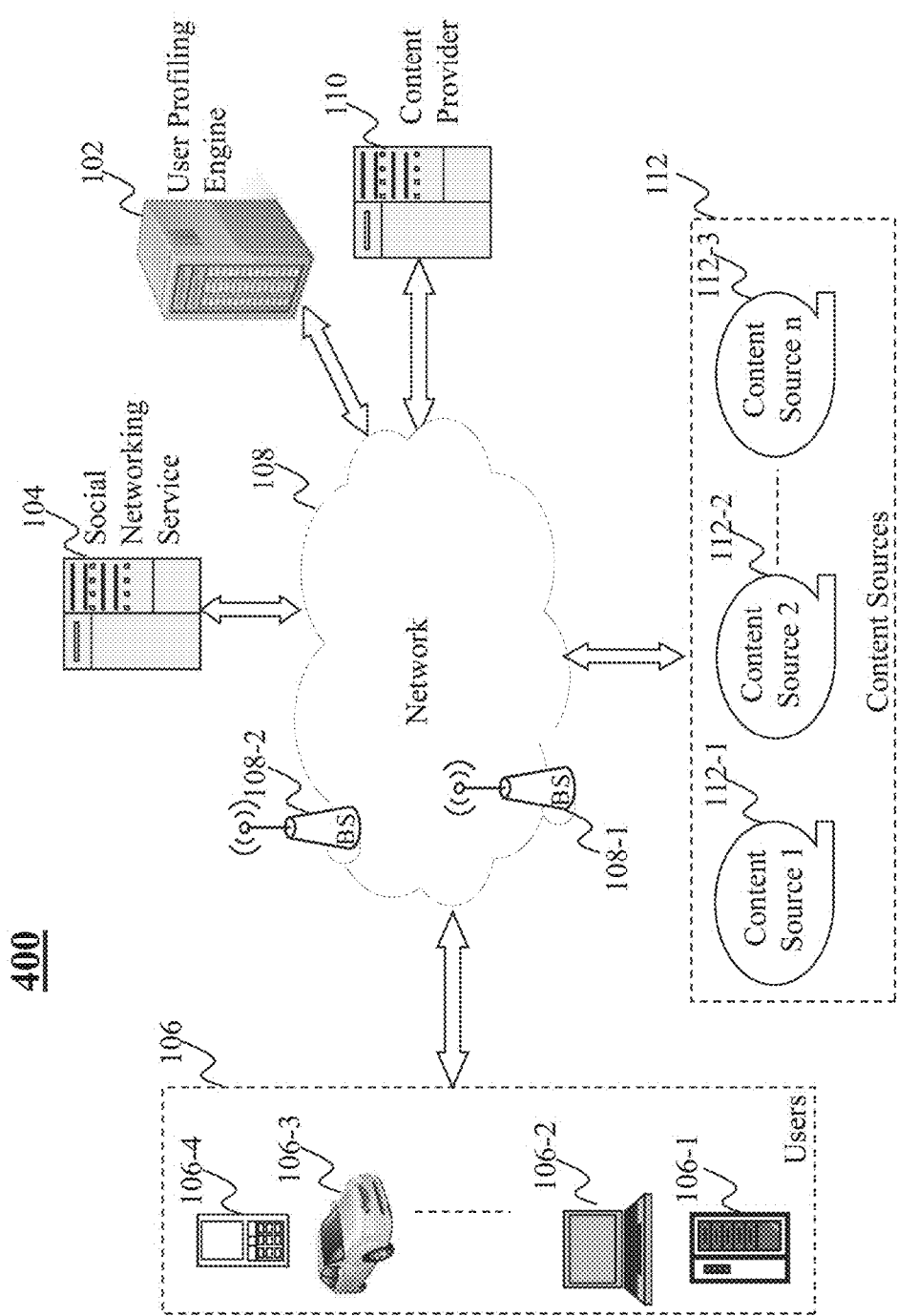

FIG. 3 shows a system configuration 100 in which the user profiling engine 102 is coupled to the social networking service 104 and the content provider 110 as a backend sub-system. In this configuration, the user profiling engine 102 as shown is used only by the social networking service 104 and/or the content provider 110 in operation. FIG. 4 presents a slightly different system configuration 400 in which the user profiling engine 102 serves as an independent service provider in relation to the social networking service 104 and the content provider 110. In this configuration, the user profiling engine 102 can be connected to a plurality of social networking services and a plurality of content providers. The user profiling engine 102 facilitates online user profiling as a service to any social networking service or content provider.

Figure 5:
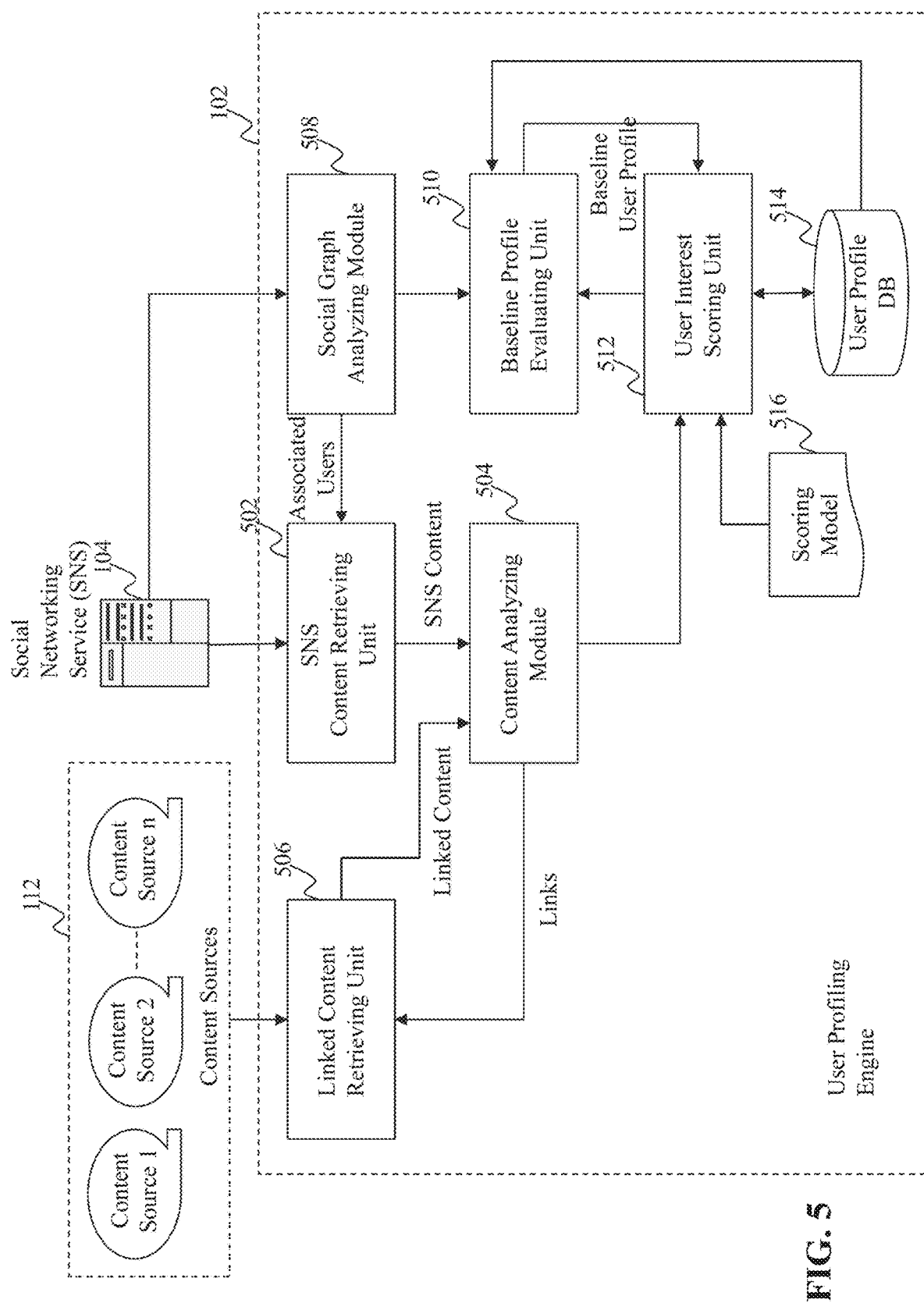
FIG. 5 is an exemplary system diagram of a user profiling engine, according to an embodiment of the present teaching.

FIG. 5 is an exemplary system diagram of a user profiling engine, according to an embodiment of the present teaching. The user profiling engine 102 in this embodiment is operatively coupled to the social networking service 104 and the content sources 112 and is configured to create user profiles of any user of the social networking service 104 based on both content in the social networking service 104 and linked content retrieved from the content sources 112. The user profiling engine 102 in this embodiment includes a SNS content retrieving unit 502, a content analyzing module 504, a linked content retrieving unit 506, a social graph analyzing module 508, a baseline profile evaluating unit 510, and a user interest scoring unit 512.

The SNS content retrieving unit 502 in this embodiment obtains content associated with a user of the social networking service 104 (social media network). The content may be any content produced by the user (e.g., posts, tweets, etc.) or content consumed by the user (e.g., liked posts, re-tweets, etc.) in the context of the social networking service 104. The obtained SNS content is forwarded to the content analyzing module 504. As will be described in further detail below, based on any suitable content analysis models, such as a content analysis platform (CAP) model, a nature language processing (NLP) model, etc., the content analyzing module 504 extracts features from the SNS content, aggregates the features from different pieces of SNS content of the same user, and forwards the aggregated features to the user interest scoring unit 512. The content analyzing module 504 in this example also identifies and extracts links, such as URLs, from the SNS content of the user and provides the extracted links to the linked content retrieving unit 506.

The linked content retrieving unit 506 in this example is responsible for retrieving additional content directed by the extract links from the content sources 112. For example, if a Twitter user's most-recent tweet includes a URL—http://www.nfl.com/superbowl/49, then the linked content retrieving unit 506 will fetch the content from the 2015 Super Bowl official site directed by the URL. The linked content is returned back to the content analyzing module 504 by the linked content retrieving unit 506 so that the content analyzing module 504 may further extract features from the linked content. In this example, the linked content retrieving unit 506 retrieves links for generating and updating user profiles of a set of users of interest, for example, the users mapped from the content provider 110 as shown in FIGS. 3-4. In this example, the content analyzing module 504 may not further identify and extract links from the linked content. All the features extracted by the content analyzing module 504, either from the SNS content or the linked content, are sent to the user interest scoring unit 512 for generating the user profile vector.

The social graph analyzing module 508 in this example is configured to identify additional user(s) of the social networking service 104, whom are associated with the user of interest in the context of the social networking service 104. In this example, other users followed by the user of interest in the social networking service 104 are identified by the social graph analyzing module 508, for example, based on user connections and user social graph within the social networking service 104. The "following" relationship within a social networking service is one example of sharing common interests among different users. In some embodiments, the additional user(s) may be users in the same user group/circle with the user of interest within the social networking service 104. It is understood that any other suitable user relationships within a social networking service may be used as well in identifying additional user(s) for enriching information in user profiling. As shown in FIG. 5, the identified associated user(s) are provided to the SNS content retrieving unit 502. The SNS content retrieving unit 502, the content analyzing module 504, and the linked content retrieving unit 506 then repeat their functions as described above to extract features from the SNS content and linked content of each associated user. All the extracted features from content related to the associated user(s) are similarly provided to the user interest scoring unit 512 for generating the user profile of the user of interest.

The user interest scoring unit 512 in this example is responsible for generating a user profile of the user of interest, for example, in the form of a user profile vector, based on the features extracted by the content analyzing module 504. The features may come from the user's own SNS content, the user's linked content, the associated user(s)' SNS content, and/or the associated user(s)' linked content. A scoring model 516 may be used by the user interest scoring unit 512 for generating the user profile and will be described in detail below. In one example, a score for each aggregated feature is calculated based on occurrence of the feature in any or all of the content mentioned above, and the user profile vector is created based on the scores of each aggregated feature. In some embodiments, the relevance between each feature and the content may be used to calculate the score of the feature. All the user profiles generated by various users of the social networking service 104 may be stored in a user profile database 514. In this example, each user profile is generated by collecting the user's content within a predefined time window (e.g., two weeks) and kept updating periodically (e.g., on the daily basis) on dynamically in real-time (e.g., anytime a new piece of content associated with the user is obtained, or a new associated user is identified). In updating an existing user profile, historical weights of existing interests in the user profile may be decayed by a time decay factor, e.g., exponentially, and added to the updated weights.

The baseline profile evaluating unit 510 in this example is configured to generate the baseline user profile of a group of users of the social networking service 104. In one example, the group users may be all the users of the social network service 104. In another example, the baseline profile evaluating unit 510 may identify a particular user cohort based on the social graph of the user of interest, which is obtained from the social graph analyzing module 508. For example, the user cohort may be all the users who are in the same user group(s) with the user of interest. In still another example, the group of user may be any random users of the social networking service 104. In any event, the baseline profile evaluating unit 510 may retrieve user profiles of the group of users and generate a baseline profile based on the user profiles. The baseline profile indicates the background strength of each user interest and reflects the general popularity of each user interest. In this example, the user interest scoring unit 512 may adjust the user profile of each user of interest based on the baseline user profile.

Figure 6:
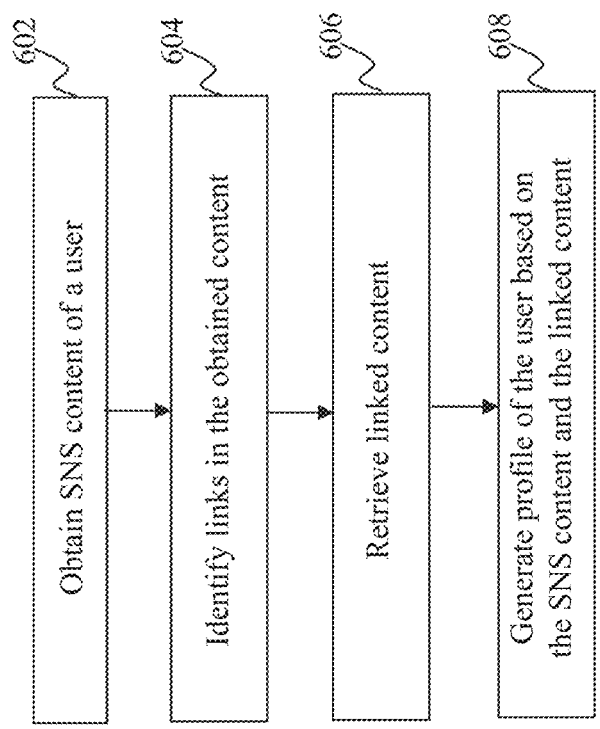
FIG. 6 is a flowchart of an exemplary process for a user profiling engine, according to an embodiment of the present teaching.

FIG. 6 is a flowchart of an exemplary process for a user profiling engine, according to an embodiment of the present teaching. Starting at 602, content associated with a user in a social media network is obtained. The content may be, for example, tweets or re-tweets of a Twitter user posted in a predefined time window. At 604, links are identified in the obtained SNS content. The links, for example, URLs contained in the tweets or re-tweets, may be identified from the SNS content. At 606, linked content, e.g., web pages pointed to by the URLs, is retrieved. At 608, the profile of the user is generated based on the SNS content and the linked content. The profile may be a feature vector including, scores of user interest features extracted from the SNS content and linked content, e.g., entities, categories, publishers, and phrases.

Figure 7:
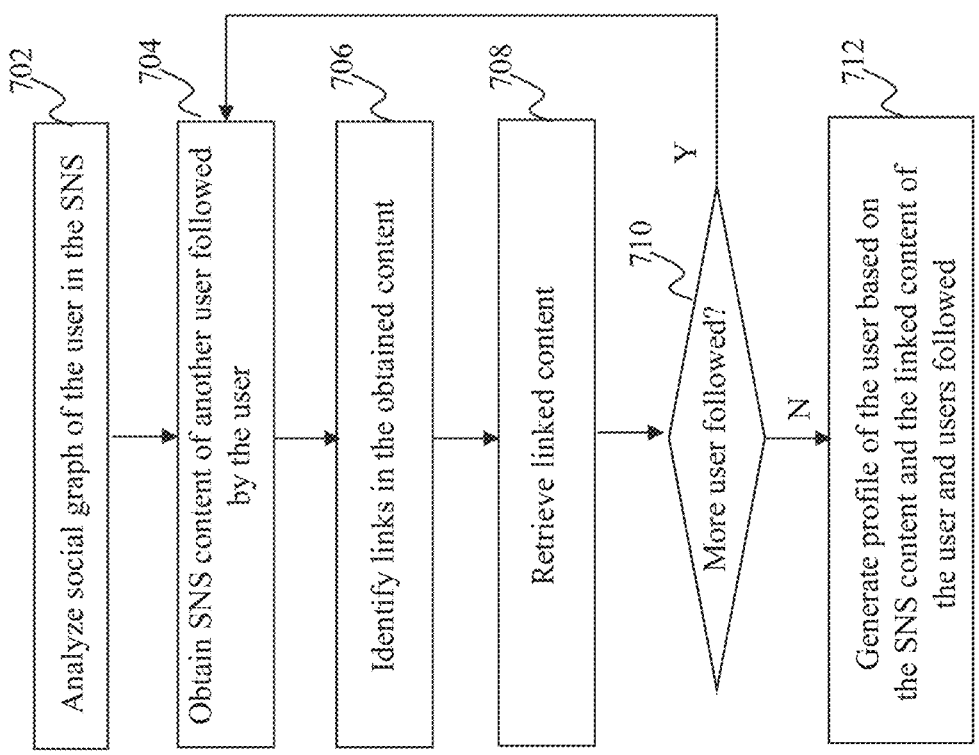
FIG. 7 is a flowchart of another exemplary process for a user profiling engine, according to an embodiment of the present teaching.

FIG. 7 is a flowchart of another exemplary process for a user profiling engine, according to an embodiment of the present teaching. Starting at 702, social graph of a user in the social media network is analyzed to identify other users associated with the user of interest in the context of the social media network. The associated users may be followed by the user of interest. At 704, SNS content of an associated user is obtained. The SNS content may be, for example, tweets or re-tweets of another Twitter user followed by the user of interest. At 706, links, for example, URLs contained in the tweets or re-tweets, are identified from the SNS content of the associated user. At 708, linked content, e.g., web pages pointed to by the URLs, is retrieved. At 710, whether there are more associated users followed by the user of interest is determined. If there are still more associated users, then the process returns to 704 and repeats. Otherwise, the process continues to 712, where the profile of the user of interest is generated based on the SNS content and the linked content of both the user of interest and the associated users followed by the user of interest.

Figure 8:
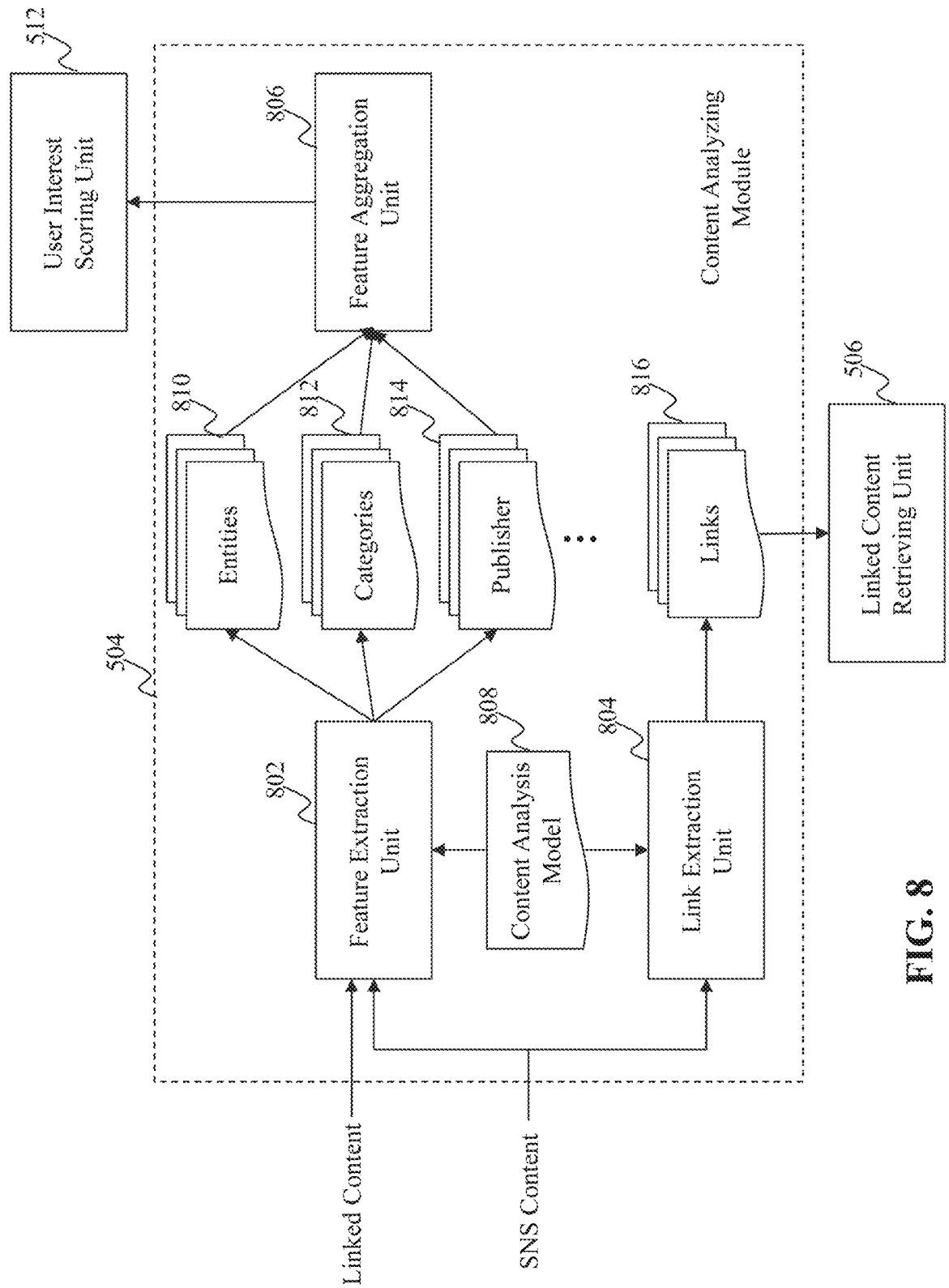
FIG. 8 is an exemplary system diagram of a content analyzing module, according to an embodiment of the present teaching.

FIG. 8 is an exemplary system diagram of a content analyzing module, according to an embodiment of the present teaching. The content analyzing module 504 in this embodiment includes a feature extraction unit 802, a link extraction unit 804, and a feature aggregation unit 806. The feature extraction unit 802 is responsible for identifying and extracting user interest features from linked content and SNS content associated with either the user of interest or the associated users within a predefined time window based on a content analysis model 808. The content analysis model 808 may be for example, a CAP model, a NLP model, or any other suitable semantic analysis model known in the art. Various types of user interest features may be extracted by the feature extraction unit 802, such as but not limited to, entities 810, categories 812, and publishers 814 (content sources). The entities 810 may be Wikipedia entities, e.g., Premier League, England, Money, Mike Tyson, Arsenal F. C., McLaren, Jenson Button, etc. The categories 812 may be any predefined interest categories, including, for example, soccer, singer, racing driver, boxer, actress, finance, etc. The publishers 814 may be any online or offline content sources from which the content is produced, such as Forbes, CNN, TechCrunch, Harvard Business Review, etc. It is understood that any other types of features that can reflect user interests may be extracted as well, such as phrases. In some embodiments, as various features may be extracted from the same piece of content, a threshold may be set to filter out certain features that are not relevant enough to the SNS or linked content. The relevance (aboutness) of a feature to the content may be calculated based on the content analysis model 808.

The feature aggregation unit 806 in this example is configured to aggregate the same user interest features from different pieces of content associated with the same user. For example, the same user interest entity of "Arsenal F. C." may be extracted from a user's SNS content, the linked content, and some of the associated users' SNS content with different relevance scores (assuming they are all above the threshold), then the feature aggregation unit 806 may aggregate the relevance scores of the same entity "Arsenal F. C." and provide it as an aggregated user interest feature.

The link extraction unit 804 in this example is responsible for identifying and extracting links 816, e.g., URLs, from the SNS content associated with either the user of interest or the associated users within the predefined time window based on the content analysis model 808. For example, in Twitter, a large amount of tweets contain URLs to news, and these links may contain even more information than the user's posted phrases. Thus, the linked content in the URLs are taken as user profile sources as well. The links 816 in this example are sent to the linked content retrieving unit 506 for fetching the corresponding linked content.

Figure 9:
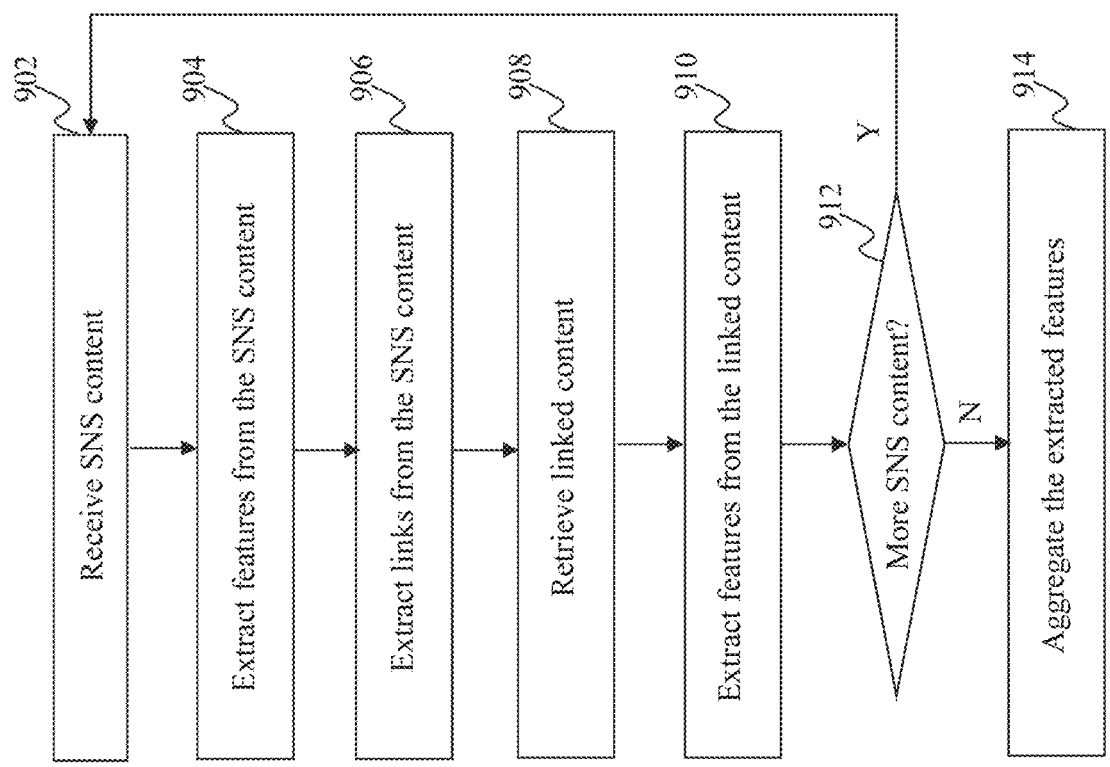
FIG. 9 is a flowchart of an exemplary process for a content analyzing module, according to an embodiment of the present teaching.

FIG. 9 is a flowchart of an exemplary process for a content analyzing module, according to an embodiment of the present teaching. Starting at 902, SNS content associated with a user is received within a predefined time window. At 904, user interest features are extracted from the obtained SNS content, including entities, categories, publishers, phrases, etc. At 906, links, e.g., URLs, are extracted from the SNS content. At 908, content linked by the URLs is retrieved. At 910, user interest features are extracted from the linked content as well. At 912, whether there are additional pieces of SNS content is received within the predefined time window is determined. If the answer is positive, then the process returns to 902 and repeats. Otherwise, the process continues to 914, where all user interest features from different user profile sources, e.g., SNS content and linked content, are aggregated.

Figure 10:
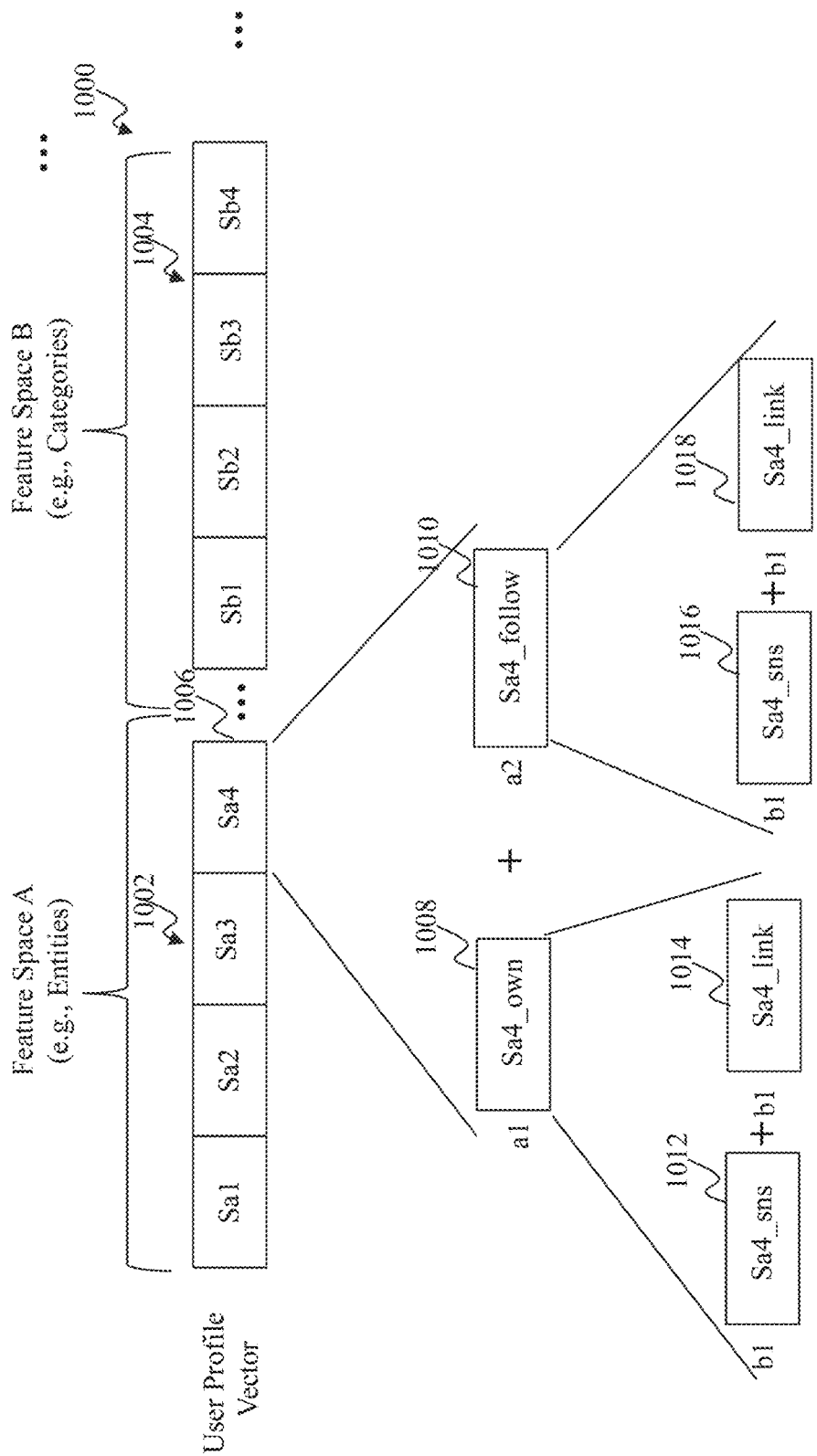
FIG. 10 depicts an exemplary user profile vector constructed based on social media network signals, according to an embodiment of the present teaching.

FIG. 10 depicts an exemplary user profile vector constructed based on social media network signals, according to an embodiment of the present teaching. The user profile vector 1000 in this example includes various feature spaces, such as feature space A 1002 for entities and feature space B 1004 for categories. Additional feature spaces, such as publishers, may be included as well. Each user interest feature is represented by a score (Sa1, Sa2, . . . , Sb1, Sb2, . . . ) calculated based on the relevance between the corresponding aggregated user interest feature with respect to content. Taking feature score Sa4 1006 as an example, it may be calculated as a weighted summation of a score Sa4_own 1008 and a score Sa4_follow 1010. Sa4_own 1008 may be calculated based on the same user interest feature (corresponding to the entity of Sa4 1002) extracted from the user's own SNS content and linked content thereof; Sa4_follow 1010 may be calculated based on the same user interest feature (corresponding to the entity of Sa4 1002) extracted from the associated users' (e.g., other users followed by the user of interest) SNS content and linked content thereof. Each of Sa4_own 1008 and Sa4_follow 1010 may be assigned with a respective weight a1, a2, in calculating Sa4 1002. Moreover, Sa4_own 1008 may be calculated as a weighted summation of a score Sa4_sns 1012 and a score Sa4_link 1014. Sa4_sns 1012 may be calculated based on the same user interest feature (corresponding to the entity of Sa4 1002) extracted from the user's own SNS content; Sa4_link 1014 may be calculated based on the same user interest feature (corresponding to the entity of Sa4 1002) extracted from the user's linked content. Each of Sa4_sns 1012 and Sa4_link 1014 may be assigned with a respective weight b1, b2, in calculating Sa4_own 1008. In a similar manner, Sa4_follow 1010 may be calculated as a weighted summation of a score Sa4_sns 1016 and a score Sa4_link 1018.

The following disclosure shows an example of calculating a Twitter user profile vector. Given a Twitter user U (specified either by twitter name or twitter ID), the user's Twitter profile can be generated by the following steps:

(1) Retrieve the set of users U follows using twitter API (https://dev.twitter.com). Denote these users as $U_f = \{U^i_f\}_{i=1}^n$, where n is the number users U follows.

(2) For each $U^i_f \in U_f$, collect all the tweets he/she posted in recent two weeks. For each linked content item, extract Wikipedia terms (wiki entities), categories and publishers by the CAP model. Then, the URL can be represented as a triple <W, P, C>, where W, P and C refer to the wiki entities, publisher and categories associated with the URL, respectively. Since each property (wiki, publisher or category) is assigned with an aboutness score by the CAP model according to its relevance to the URL, a threshold 0.5 is set to filter out the wiki entities and categories which are less relevant.

Thereafter, $U^j_f$'s profile is represented as a triple $\langle W_j, P_j, C_j \rangle$, where $W_j = \{(w_j^1, sc_j^1), (w_j^2, sc_j^2), \ldots, (w_j^K, sc_j^K)\}$ is the set of tuples containing wikis associated with $U^j_f$ and their scores. The scores $sc_j^i$ is computed as follows:

$$sc_j^i = \frac{\sum_{url \in l} AbtScore(w_j^i, url)}{\sum_{url' \in l} \sum_{w_j^k \in url'} AbtScore(w_j^k, url')} \quad (1)$$

where I is the whole set of URLs tweeted by $U_j^i$ in recent two weeks, AbtScore($w_i$,url) is the aboutness score of wiki term $w_i$ in the content item URL computed by the CAP model. The scores for publishers and categories are computed in the same manner.

(3) Finally the user's profile from the following graph is also represented as a trip <W, P, C>, and the score for each user interest feature is the sum of all its scores from all the following users. The profile from the user U's own tweets can be calculated in the same way as above and add it to the following graph profile.

Figure 11:
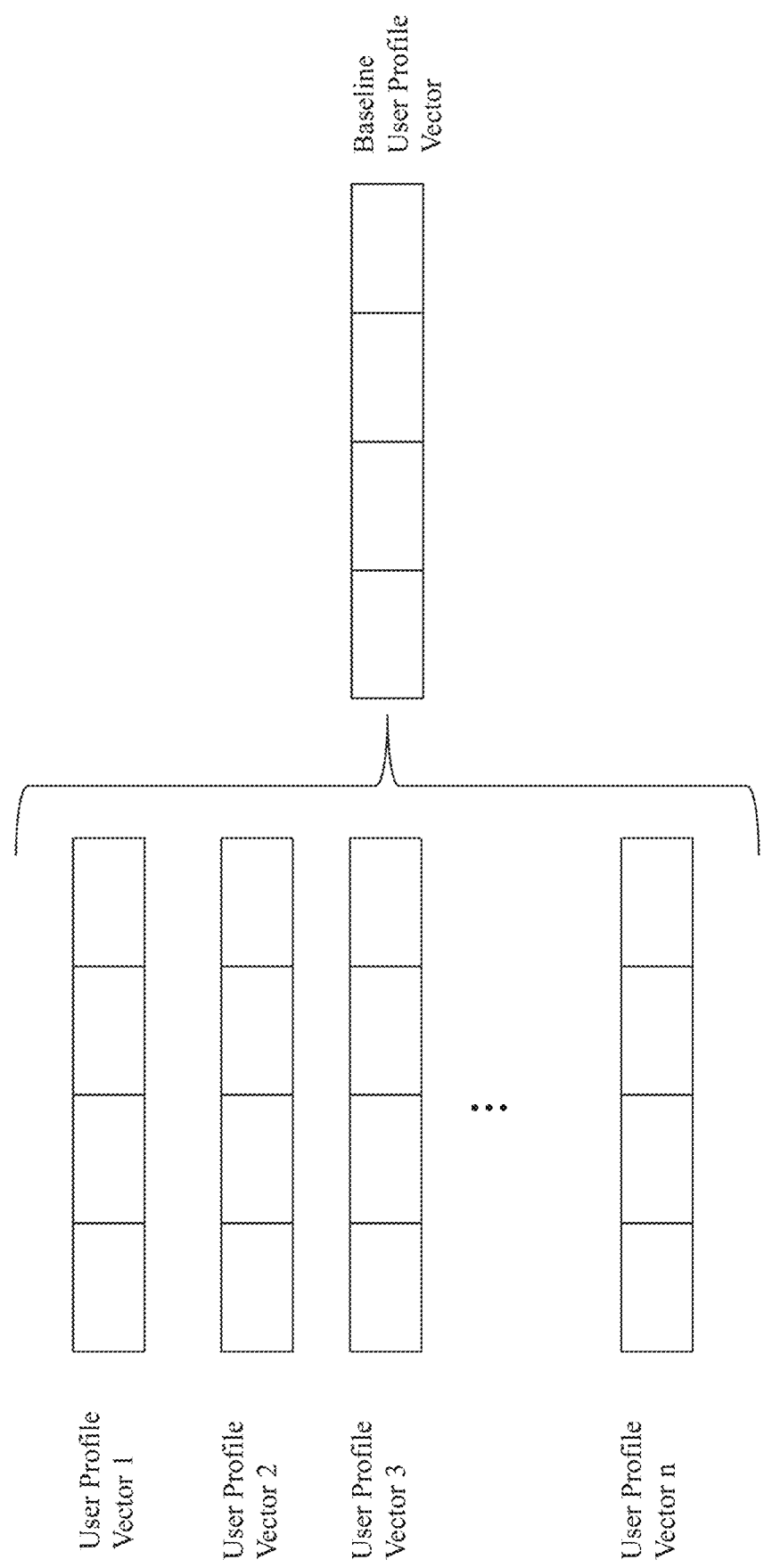
FIG. 11 depicts an exemplary baseline user profile vector constructed based on a plurality of user profile vectors, according to an embodiment of the present teaching.

FIG. 11 depicts an exemplary baseline user profile vector constructed based on a plurality of user profile vectors, according to an embodiment of the present teaching. The baseline user profile vector in this example is generated based on user profile vectors 1-$n$ from a reference user pool, which may be as large as all the users in the social networking service 104. In the same example as mentioned of calculating a Twitter user profile vector, the baseline Twitter user profile generation and user Twitter profile adjustment (re-weighing) may be performed as following:

(4) Apply the term re-weighting algorithm to penalize the general popular interest among all the users and promote user's unique interest. This step is used to penalize the profile items (wiki terms, categories or publishers) which are popular among all the users. Given a profile feature, for example, a wiki term $w_k$, compute the background strength of this term as $$P_b(W^k) = \frac{\sum_i sc_i^{w^k}}{\sum_i \sum_j sc_i^{w^j}} \quad (2)$$

Here, $sc_i^{w^k}$ refers to the profile score of $w_k$ for user $U_i$. Hence, the background strength of a wiki terms refers to its popularity compared to other wikis. Then, the expected profile score of $w_k$ for user $U_i$ (baseline user profile) can be computed as $e_{U_i}^{w^k} = P_b(w^k) \cdot \Sigma_j sc_i^{w^j}$. And the profile score of $w_k$ for $U_i$ is reweighted as $$rsc_i^{w^k} = \frac{sc_i^{w^k}}{e_{U_i}^{w^k}} \quad (3)$$

Figure 12:
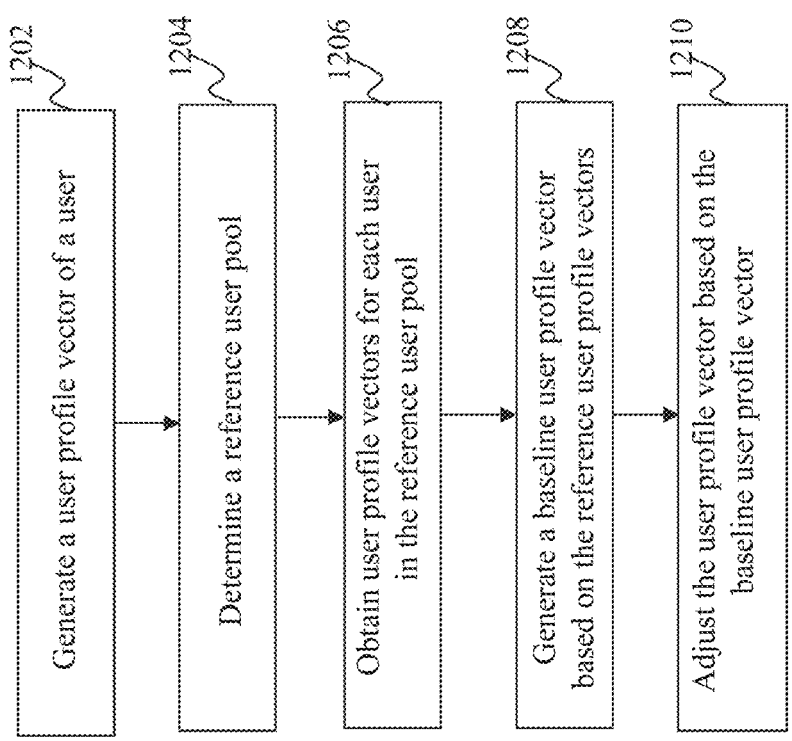
FIG. 12 is a flowchart of an exemplary process for a baseline profile evaluating unit, according to an embodiment of the present teaching.

FIG. 12 is a flowchart of an exemplary process for a baseline profile evaluating unit, according to an embodiment of the present teaching. Starting at 1202, a user profile vector of a user of interest is generated. At 1204, a reference user pool is determined. In one example, the reference user pool includes all users of the social media network. In another example, the reference user pool includes all users in the same user group(s) with the user of interest in the social media network. In still another example, the reference user pool includes all users connected to and/or followed by the user of interest in the social media network. In yet another example, the reference user pool includes random users of the social media network. At 1206, user profile vectors for each user in the reference user pool are obtained. At 1208, a baseline user profile vector is generated based on the reference user profile vectors. At 1210, the user profile vector of the user of interest is adjusted based on the baseline user profile vector.

Figure 13:
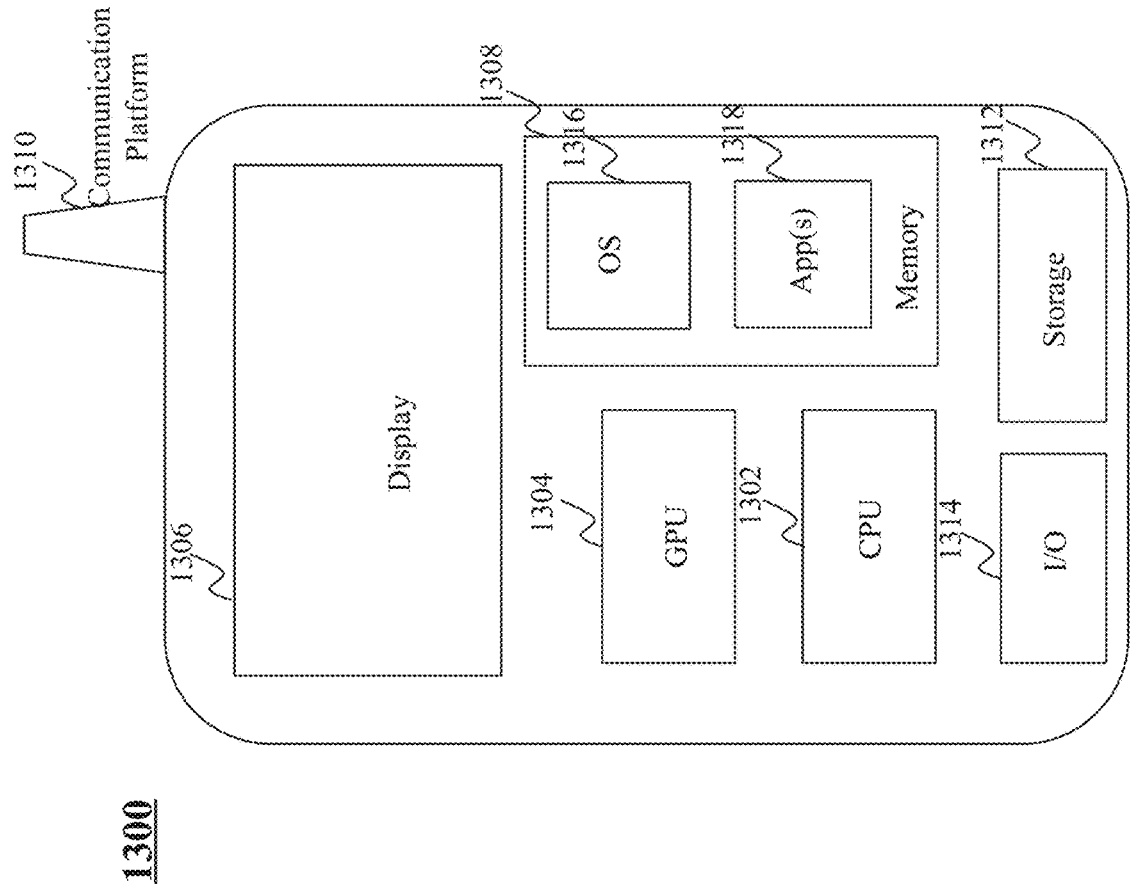
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which content is presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1302, one or more graphic processing units (GPUs) 1304, a display 1306, a memory 1308, a communication platform 1310, such as a wireless communication module, storage 1312, and one or more input/output (I/O) devices 1314. Any other suitable component, including but not limited to a system bus or a controller (not shown), may also be included in the mobile device 1300. As shown in FIG. 13, a mobile operating system 1316, e.g., iOS, Android, Windows Phone, etc., and one or more applications 1318 may be loaded into the memory 1308 from the storage 1312 in order to be executed by the CPU 1302. The applications 1318 may include a browser or any other suitable mobile apps for receiving and interacting with content on the mobile device 1300. User interactions with the content may be achieved via the I/O devices 1314 and provided to the user profiling engine 102 via communication platform 1310.

To implement various modules, units, and their functionalities described in the present disclosure, computer hardware platforms may be used as the hardware platform(s) for one or more of the elements described herein (e.g., the user profiling engine 102 described with respect to FIGS. 1-12). The hardware elements, operating systems and programming languages of such computers are conventional in nature, and it is presumed that those skilled in the art are adequately familiar therewith to adapt those technologies to online user profiling as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
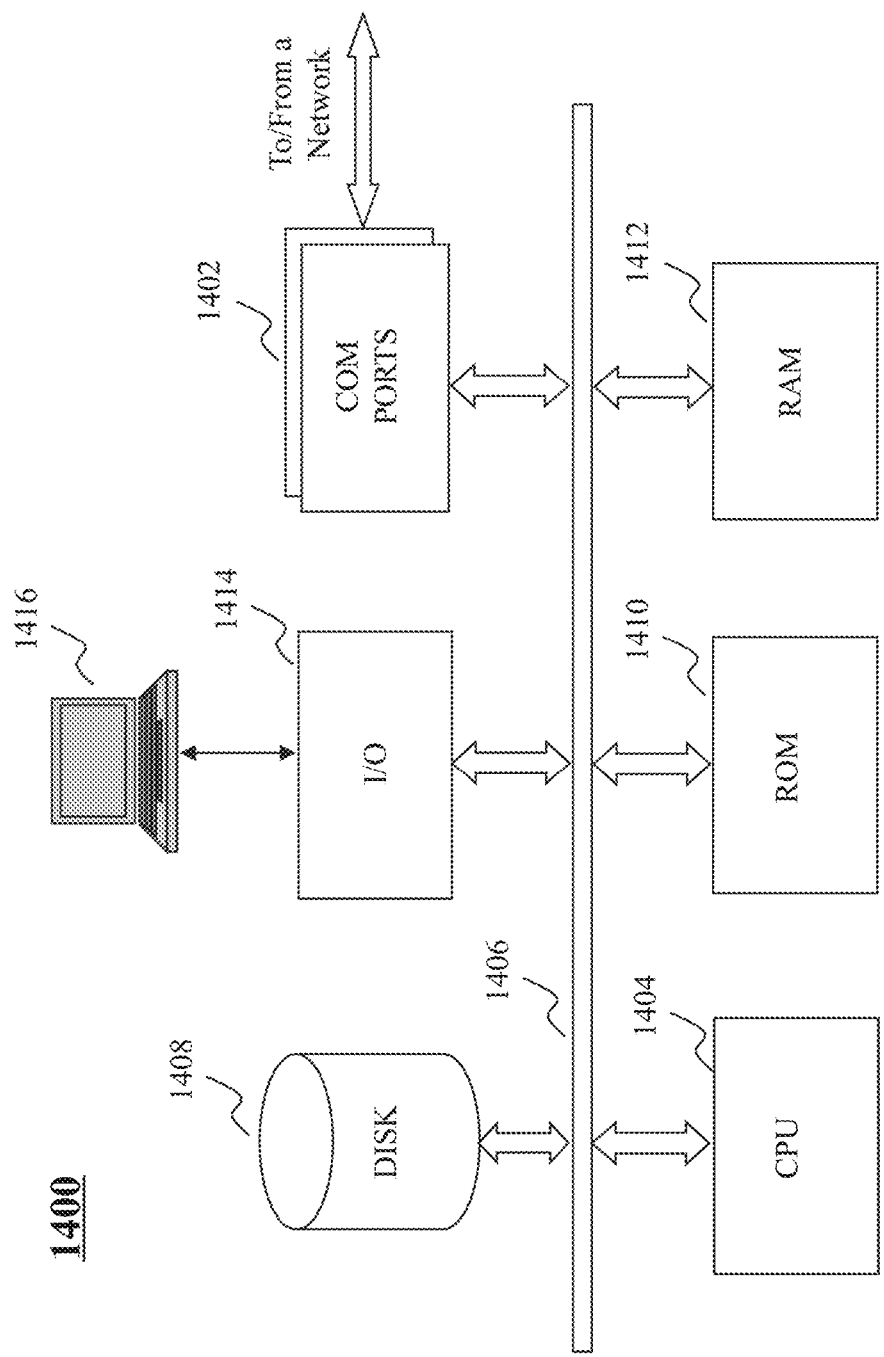
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of online user profiling techniques, as described herein. For example, the user profiling engine 102, etc., may be implemented on a computer such as computer 1400, via its hardware, software program, firmware, or a combination thereof. Although only one such computer is shown, for convenience, the computer functions relating to online user profiling as described herein may be implemented in a distributed fashion on a number of similar platforms, to distribute the processing load.

The computer 1400, for example, includes COM ports 1402 connected to and from a network connected thereto to facilitate data communications. The computer 1400 also includes a central processing unit (CPU) 1404, in the form of one or more processors, for executing program instructions. The exemplary computer platform includes an internal communication bus 1406, program storage and data storage of different forms, e.g., disk 1408, read only memory (ROM)

1410, or random access memory (RAM) 1412, for various data files to be processed and/or communicated by the computer, as well as possibly program instructions to be executed by the CPU 1404. The computer 1400 also includes an I/O component 1414, supporting input/output flows between the computer and other components therein such as user interface elements 1416. The computer 1400 may also receive programming and data via network communications.

Hence, aspects of the methods of online user profiling and/or other processes, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator into the hardware platform(s) of a computing environment or other system implementing a computing environment or similar functionalities in connection with online user profiling. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the online user profiling as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a computing device having at least one processor, storage, and a communication platform capable of connecting to a network for online user profiling, comprising:
obtaining first content associated with a first user of a social media network;
extracting, from the first content, a first link pointing to second content;
determining a second user of the social media network associated with the first user;
extracting, from third content associated with the second user, a second link pointing to fourth content;
retrieving the second content and the fourth content by accessing the first link and the second link, respectively, wherein each of the first and third content is obtained from the social media network and each of the second and fourth content is obtained from a content source not included in the social media network, the first content being different from the third content and the second content being different than the fourth content;
extracting, from the first, second, third, and fourth content, a plurality of features reflecting a corresponding user's interests, wherein the plurality of features comprise a plurality of publishers associated with the first, second, third and fourth content;
scoring each of the plurality of publishers based on relevance of the feature to each of the first, second, third, and fourth content;
generating an aggregated score for each of the plurality of publishers by weighting and aggregating scores of the publisher associated with the first, second, third, and fourth content;
filtering out at least one of the plurality of publishers based on the aggregated scores of the plurality of features;
generating a user profile of the first user based on remaining of the plurality of publishers; and
updating the user profile based on a time-decay model, wherein historical weights assigned to the scores of the plurality of publishers are updated based on the time-decay model, and the time decay model includes a time-decay factor that reduces the historical weights in an exponential manner with respect to time instances at which the first, second, third, and fourth content are obtained.

2. The method of claim 1, wherein the first user follows the second user in the social media network.

3. The method of claim 1, wherein the first content and the third content are different from the second content and the fourth content, respectively, wherein each of the contents is from a different content source.

4. The method of claim 1, further comprising:
obtaining a baseline user profile of a plurality of users of the social media network based on user profiles of each of the plurality of users; and
adjusting the user profile of the first user based on the baseline user profile.

5. The method of claim 1, wherein generating the user profile of the first user further comprises:
for each of the plurality of publishers that have been aggregated, calculating a score based on an occurrence of each feature in the second content and the fourth content and/or a relevance of each feature; and
creating a feature vector for the first user based on the scores of each of the plurality of publishers.

6. The method of claim 1, wherein the plurality of features comprise at least one of:
entities;
categories;
and
phrases.

7. The method of claim 1, further comprising weighting the scores of the plurality of features,
wherein weights assigned to the scores of the plurality of features are updated based on an inverse popularity of the respective content with respect to a plurality of users.

8. A system including at least one processor, memory coupled to the at least one processor, and a communication platform capable of connecting to a network for online user profiling comprising:
a first content retrieving unit implemented by the at least one processor and configured to obtain first content associated with a first user of a social media network;
a social graph analyzing module implemented by the at least one processor and configured to determine a second user of the social media network associated with the first user;
a link extraction unit implemented by the at least one processor and configured to extract, from the first content, a first link pointing to second content, and extract, from third content associated with the second user, a second link pointing to fourth content;
a second content retrieving unit implemented by the at least one processor and configured to retrieve the second content and the fourth content by accessing the first link and the second link, respectively, wherein each of the first and third content is obtained from the social media network and each of the second and fourth content is obtained from a content source not included in the social media network, the first content being different from the third content and the second content being different than the fourth content;
a feature extraction unit implemented by the at least one processor and configured to extract, from the first, second, third, and fourth content, a plurality of features reflecting a corresponding user's interests, wherein the plurality of features comprise a plurality of publishers associated with the first, second, third and fourth content;
a feature scoring unit implemented by the at least one processor and configured to score each of the plurality of publishers based on relevance of the feature to each of the first, second, third, and fourth content;
a feature aggregation unit implemented by the at least one processor and configured to:
generate an aggregated score for each of the plurality of publishers by aggregating scores of the feature associated with the first, second, third, and fourth content; and
filter out at least one of the plurality of publishers based on the aggregated scores of the plurality of publishers; and
a user interest scoring unit implemented by the at least one processor and configured to:
generate a user profile of the first user based on remaining of the plurality of publishers; and
update the user profile based on a time-decay model, wherein historical weights assigned to the scores of the plurality of publishers are updated based on the time-decay model, and the time decay model includes a time-decay factor that reduces the historical weights in an exponential manner with respect to time instances at which the first, second, third, and fourth content are obtained.

9. The system of claim 8, wherein the first user follows the second user in the social media network.

10. The system of claim 8, wherein the user profile of the first user is generated based, at least in part, on the first content and the third content, which are different from the second content and the fourth content, respectively, wherein each of the contents is from a different content source.

11. The system of claim 8, further comprising a baseline profile evaluating unit implemented by the at least one processor and configured to obtain a baseline user profile of a plurality of users of the social media network based on user profiles of each of the plurality of users, wherein:
the user interest scoring unit is further configured to adjust the user profile of the first user based on the baseline user profile.

12. The system of claim 8, wherein the user interest scoring unit is further configured to:
for each of the plurality of publishers that have been aggregated, calculate a score based on an occurrence of each feature in the second content and the fourth content and/or a relevance of each feature; and
create a feature vector for the first user based on the scores of each of the plurality of publishers.

13. The system of claim 8, wherein the plurality of features comprise at least one of:
entities;
categories;
and
phrases.

14. A non-transitory, machine-readable medium having information recorded thereon for online user profiling, wherein the information, when read by a machine, causes the machine to perform the following:
obtaining first content associated with a first user of a social media network;
extracting, from the first content, a first link pointing to second content;
determining a second user of the social media network associated with the first user;

extracting, from third content associated with the second user, a second link pointing to fourth content;

retrieving the second content and the fourth content by accessing the first link and the second link, respectively, wherein each of the first and third content is obtained from the social media network and each of the second and fourth content is obtained from a content source not included in the social media network, the first content being different from the third content and the second content being different than the fourth content;

extracting, from the first, second, third, and fourth content, a plurality of features reflecting a corresponding user's interests, wherein the plurality of features comprise a plurality of publishers associated with the first, second, third and fourth content;

scoring each of the plurality of publishers based on relevance of the feature to each of the first, second, third, and fourth content;

generating an aggregated score for each of the plurality of publishers by aggregating scores of the feature associated with the first, second, third, and fourth content;

filtering out at least one of the plurality of publishers based on the aggregated scores of the plurality of publishers;

generating a user profile of the first user based on remaining of the plurality of publishers; and updating the user profile based on a time-decay model, wherein historical weights assigned to the scores of the plurality of publishers are updated based on the time-decay model, and the time decay model includes a time-decay factor that reduces the historical weights in an exponential manner with respect to time instances at which the first, second, third, and fourth content are obtained.

15. The medium of claim 14, wherein the first user follows the second user in the social media network.

16. The medium of claim 14, wherein the first content and the third content are different from the second content and the fourth content, respectively, wherein each of the contents is from a different content source.

17. The medium of claim 14, wherein the information, when read by the machine, further causes the machine to perform the following:
obtaining a baseline user profile of a plurality of users of the social media network based on user profiles of each of the plurality of users; and
adjusting the user profile of the first user based on the baseline user profile.

18. The medium claim 14, wherein generating user profile of the first user further comprises the information, when read by the machine, to further cause the machine to perform the following:
for each of the plurality of publishers that have been aggregated, calculating a score based on an occurrence of each feature in the second content and the fourth content and/or a relevance of each feature; and
creating a feature vector for the first user based on the scores of each of the plurality of publishers.

* * * * *